(12) United States Patent
Bloechl et al.

(10) Patent No.: US 10,244,377 B2
(45) Date of Patent: Mar. 26, 2019

(54) BLE NETWORKING SYSTEMS AND METHODS PROVIDING CENTRAL AND PERIPHERAL ROLE REVERSAL ACCORDING TO NETWORK PROVISIONED TIMING THEREFOR

(71) Applicant: Link Labs, Inc., Annapolis, MD (US)

(72) Inventors: Mark Bloechl, Elkridge, MD (US); Scott Wohler, Halethorpe, MD (US); Ricardo Luna, Jr., Las Cruces, NM (US); Patrick Li, Potomac, MD (US); Brian Emery Ray, Annapolis, MD (US)

(73) Assignee: LINK LABS, INC., Annapolis, MD (US)

( * ) Notice: Subject to any disclaimer, the term of this patent is extended or adjusted under 35 U.S.C. 154(b) by 0 days.

(21) Appl. No.: 15/957,025

(22) Filed: Apr. 19, 2018

(65) Prior Publication Data

US 2018/0367973 A1    Dec. 20, 2018

Related U.S. Application Data

(63) Continuation-in-part of application No. 15/927,388, filed on Mar. 21, 2018, which is a
(Continued)

(51) Int. Cl.
*H04W 4/80* (2018.01)
*H04W 48/12* (2009.01)
(Continued)

(52) U.S. Cl.
CPC .............. *H04W 4/80* (2018.02); *H04W 48/12* (2013.01); *H04B 17/318* (2015.01); *H04W 48/20* (2013.01); *H04W 52/0209* (2013.01)

(58) Field of Classification Search
CPC ....... H04W 4/80; H04W 48/12; H04W 48/20; H04W 52/0209; H04B 17/318
See application file for complete search history.

(56) References Cited

U.S. PATENT DOCUMENTS 5,920,287 A    7/1999    Belcher
6,469,628 B1   10/2002   Richards
(Continued)

FOREIGN PATENT DOCUMENTS

WO    WO 2016/053909    4/2016

OTHER PUBLICATIONS

Bluetooth Core Specification v 5.0, Dec. 2016, pp. 252-256.

*Primary Examiner* — Nay A Maung
*Assistant Examiner* — Angelica M Perez
(74) *Attorney, Agent, or Firm* — Charles B. Lobsenz; Brian H. Buck; Potomac Law Group, PLLC

(57) ABSTRACT

Provided are systems and methods for reversing the conventional roles of central and peripheral devices in a BLE network. Doing so includes implementing an end node (EN) as the sole initiator of a connection between a particular EN and other components within the network. Such initiating is controllable by the network so as to effect a transfer of EN functionality among one or more of the other components. Implementation of the transfer depends on a network controlled timing determining functionality of all network components. Accordingly, the network is enabled to effect the power consumption of those components in an effort to optimize use of their respective power resources.

30 Claims, 14 Drawing Sheets

Related U.S. Application Data continuation-in-part of application No. 15/626,083, filed on Jun. 17, 2017.

(51) Int. Cl.
　　　*H04W 52/02*　　　(2009.01)
　　　*H04B 17/318*　　　(2015.01)
　　　*H04W 48/20*　　　(2009.01)

(56) References Cited

U.S. PATENT DOCUMENTS

| | | |
|---|---|---|
| 7,141,715 B2 | 11/2006 | Shapira |
| 7,242,294 B2 | 7/2007 | Warrior |
| 7,411,921 B2 | 8/2008 | Strong |
| 7,518,500 B2 | 4/2009 | Aninye |
| 7,973,655 B2 | 7/2011 | Blinnikka |
| 8,026,814 B1 | 9/2011 | Heinze |
| 8,368,555 B2 | 2/2013 | Gilbert |
| 8,712,330 B2 | 4/2014 | Desai |
| 8,831,627 B2 | 9/2014 | Aninye |
| 8,849,926 B2 | 9/2014 | Marzencki |
| 9,328,857 B2 | 5/2016 | Conte |
| 9,374,667 B1 | 6/2016 | Jorgensen et al. |
| 9,426,616 B1 | 8/2016 | Rasband |
| 9,439,041 B2 | 9/2016 | Parvizi |
| 9,788,167 B2 | 10/2017 | Geng et al. |
| 9,992,633 B2 | 6/2018 | Geng et al. |
| 2005/0113132 A1 | 5/2005 | Irsheid |
| 2005/0250519 A1 | 11/2005 | Samuel |
| 2007/0001813 A1 | 1/2007 | Maguire |
| 2007/0004426 A1 | 1/2007 | Pfleging |
| 2007/0046459 A1 | 3/2007 | Silverman |
| 2009/0092049 A1 | 4/2009 | Hargrave |
| 2010/0131567 A1 | 5/2010 | Dorogusker |
| 2012/0311149 A1 | 12/2012 | Trevino |
| 2013/0060351 A1 | 3/2013 | Imming |
| 2013/0065603 A1 | 3/2013 | Hovav |
| 2013/0314210 A1 | 11/2013 | Schoner |
| 2013/0317944 A1 | 11/2013 | Huang |
| 2014/0149004 A1 | 5/2014 | Best |
| 2015/0282113 A1 | 10/2015 | Costa |
| 2015/0296332 A1 | 10/2015 | Lee |
| 2015/0356498 A1 | 12/2015 | Casanova |
| 2016/0012196 A1 | 1/2016 | Mark |
| 2016/0106762 A1 | 4/2016 | Singh |
| 2016/0112886 A1 | 4/2016 | Malik |
| 2016/0117213 A1 | 4/2016 | Arjun |
| 2016/0127883 A1 | 5/2016 | Zhou |
| 2016/0127996 A1 | 5/2016 | Patil |
| 2016/0142868 A1* | 5/2016 | Kulkarni ................. H01Q 1/24 455/456.5 |
| 2016/0183042 A1 | 6/2016 | Weizman |
| 2017/0076332 A1 | 3/2017 | Jung |
| 2017/0085417 A1 | 3/2017 | O'Reirdan |
| 2018/0084588 A1 | 3/2018 | Khoury |
| 2018/0160282 A1 | 6/2018 | van de Poll |
| 2018/0160334 A1* | 6/2018 | Deshpande ........... H04W 28/08 |

* cited by examiner

FROM 560

END NODE (EN) HEARTBEAT MESSAGE TRANSMISSIONS
DURING TRANSIT TO TARGET DESTINATION (TD)

FIG. 13

NETWORK COMPONENT ACTIVITY

| COMPONENT | SCENARIO 1 | SCENARIO 2 | SCENARIO 3 |
|---|---|---|---|
| Stationary AP | 1 | 1 | 1 |
| Mobile AP | 1 | 1 | 1 |
| RP | 1 | 0 | 1 |
| EN | 1 | 0 | 0 |

Legend:

1 = Awake
0 = Sleeping

BLE NETWORKING SYSTEMS AND METHODS PROVIDING CENTRAL AND PERIPHERAL ROLE REVERSAL ACCORDING TO NETWORK PROVISIONED TIMING THEREFOR

CROSS-REFERENCE TO RELATED APPLICATIONS

This is a continuation-in-part of application Ser. No. 15/927,388, filed Mar. 21, 2018, which, in turn, is a continuation-in-part of application Ser. No. 15/626,083, filed Jun. 17, 2017, the entire contents of application Ser. Nos. 15/927,388 and 15/626,083 being hereby incorporated by reference, and to each of which priority is claimed under 35 U.S.C. § 120.

FIELD OF THE DISCLOSURE

Disclosed embodiments relate to wireless communications, and more specifically, to wireless communication among BLUETOOTH Low Energy (BLE) equipped devices in which conventional BLE central and peripheral roles of those devices are reversed and made applicable to nodes of a BLE-enabled network so as to enhance BLE networking capability.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

The BLUETOOTH Special Interest Group devised BLE particularly in consideration of IoT devices and applications which do not rely upon continuous connection(s), but depend on extended battery life. A good example of these devices includes a temperature sensor which intermittently provides temperature readings to a collector device that collects such readings. That is, continuous connection between the sensor and collector is not necessary to obtain, for example, such temperature reading at a discrete point in time.

The BLUETOOTH specification governing operation of BLE devices relates definitional roles to each of the above sensor and collector as peripheral and central, respectively.

In accordance with customary BLE networking operations, a peripheral, such as a sensor above, makes its presence known to any central, such as a collector above, merely by continuously "advertising" its presence. In other words, the peripheral continuously sends beacon advertisement messages for recognition by a central that itself decides whether connection with the recognized peripheral should occur. In a BLE environment, such advertising occurs across three advertising channels, or frequencies, so as to reduce instances of interference among signals sent by multiple peripherals.

Yet, existing within such a BLE environment are several impediments to optimal communication between a peripheral device, such as an end node (EN), and a central device, such as an access point (AP).

An example of such an impediment exists in the form of an uncertainty that a peripheral device may experience in actually knowing why its broadcast advertisement has not been acknowledged by a central device. Specifically, such uncertainty exists due to the peripheral's inability to know whether a central device is in a range enabling receipt of its advertisement, or additionally, whether a central device that is in range is simply overloaded such that it has not had sufficient time or capacity to process the peripheral's advertisement.

Yet a further impediment that exists to an optimal relationship between a peripheral and central is congestion across the advertising channels leading to opportunities for signaling collision and missed advertisements, each of which causes a lack of connection. These failures are prevalent in scenarios in which multiple peripherals are co-located, i.e., disposed in or at a same space within a structure such as a building or other venue in which peripheral and central functionality are required or desired.

A still further impediment to BLE networking exists in the fundamental complexity brought about by the conventional BLE peripheral/central relationship. In this relationship, a mobile peripheral which moves out of range of a central such as a first network access point (AP) to which it had previously connected essentially loses any established relationship that such peripheral made with that first AP. In this case, when the peripheral moves within range of another, second AP, this second AP is not immediately able to know, due to the established relationship of the peripheral with the first AP, whether a connection should be made in view of considerations including network configuration, security and authentication. The only basis for informing the second AP whether connection with the peripheral should occur is information it receives from a coordinating application running on the BLE network and that provides information to APs concerning whether connection should be made with a peripheral as a result of its broadcast advertisement. However, by the time the coordinating application learns of the lost connection with the first AP in the above scenario, a considerable amount of time has elapsed before connection information can be, or is, provided by the coordinating application to the second AP in order to allow it to determine that it should connect with the peripheral. Thus, in these ways, it will be understood that enabling connection with a peripheral moving among several APs is not only complex, but further disadvantages exist insofar as increased connection latency and a higher utilization of backhaul due to necessary information that must flow to and from the coordinating application.

Thus, it would be desirable to provide for one or more optimized BLE networking relationships that address and overcome the aforementioned impediments and disadvantages now associated with the conventional BLE central/peripheral networking relationship discussed above. More specifically, it would be desirable to provide applicability of such optimized BLE relationships in connection with various application environments such as, for example, providing healthcare, improving fitness, improving internet connectivity, improving proximity sensing, improving alert systems, improving jobsite monitoring, improving systems controlling access, improving automation and improving systems and methods for tracking assets to be inventoried and for which location must be determined, whether in a commercial or residential setting, as well as any other application in which a BLE networking protocol is deployed.

In association with such optimization, it would be further desirable to, for example, coordinate the tracking of such assets as those assets are in transit between multiple locations, and, for instance, relative to a final, target destination. Still further, it would also be desirable to conduct that tracking as efficiently as possible so as to conserve energy while the tracking is to occur, and to also achieve such energy conservation while executing one or more of the otherwise mentioned application environments.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes a BLE communications system for communicating with a network, including an access point (AP) configured to connect with the network, and transmit a first beacon advertisement message, an AP not configured to connect with the network, and transmit a second beacon advertisement message, so as to define a reference point (RP), an end node (EN) configured to receive the first and second beacon advertisement messages, and initiate a connection with the AP for the transfer of data associated with the EN to the network, and the receipt of data from the network, in which each of the AP, the RP, and the EN are configured by the network to operate according to either an awakened state or a sleep state, the AP being selected as comprising a stationary AP, or a mobile AP.

A further aspect of the embodiments includes a method of BLE communications, including, in a system comprising an access point (AP) configured to connect to a network and transmit a first beacon advertisement message, an AP not configured to connect to the network, and transmit a second beacon advertisement message so as to define a reference point (RP), and an end node (EN), in which the AP is selected as comprising a stationary AP, or a mobile AP, and the EN is configured to initiate a connection with the AP in response to the receipt of the first beacon advertisement message, operating each of the selected AP, the RP, and the EN according to a predetermined network timing configured to trigger an alternate mode of operation of the selected AP, or the RP, or a combination thereof.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein:

FIG. 13 is a table setting forth exemplary BLE network component activity according to scenarios for such activity.

DETAILED DESCRIPTION

Figure 1:
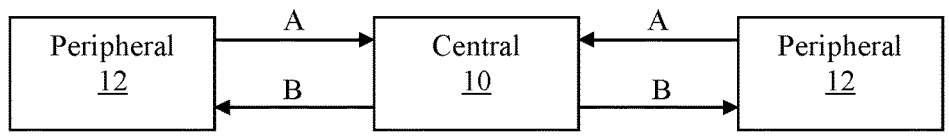
FIG. 1 is an illustration of BLE transmission of a beacon advertisement message between a BLE central and a BLE peripheral, according to the related art.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

BLE networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point (AP), or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Typically, in the context of BLE communications, one or more of these devices assume the roles of a central 10 and a peripheral 12, as shown in FIG. 1. A peripheral is generally understood as a device which merely broadcasts, or advertises, its presence toward another device referred to as a central, with the intent that such presence be detected by that central. The broadcast generally takes the form of a beacon advertisement message transmitted as a radio frequency (RF) signal. Should detection occur, it is also generally understood that it is the central that determines whether a connection with the peripheral should occur. If the answer to that determination is in the affirmative, the central establishes a connection, and also prescribes all conditions under which any connection with a peripheral is to be made. The directional flow of transmission of the beacon advertisement message comprising a RF signal from the peripheral is shown by arrows "A," in FIG. 1, while the directional flow of establishment of a connection with the peripheral by the central is shown by arrows "B."

Such a scheme renders BLE networking susceptible to the many shortcomings discussed hereinabove.

Thus, in an effort to address those shortcomings, embodiments disclosed herein reverse the directional flows of transmission of the beacon advertisement message and connection so as to thereby reverse the roles of a conventional central and a conventional peripheral, and make such role reversal applicable to appropriate nodes in a BLE-enabled network.

Figure 2:
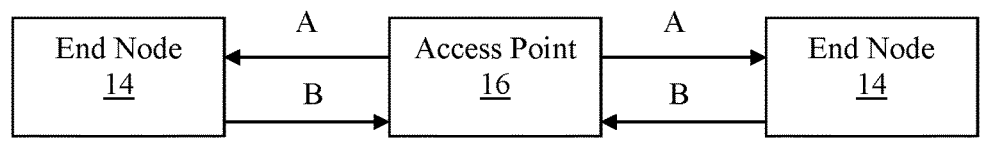
FIG. 2 is an illustration of BLE transmission of a beacon advertisement message between a BLE end node (EN) and a BLE access point (AP), according to embodiments disclosed herein.

FIG. 2 illustrates such reversal of roles insofar as each of exemplary battery-powered BLE end nodes (ENs) 14 are responsible for detection of a beacon advertisement message transmitted from an exemplary battery-powered BLE access point (AP) 16 in the direction of arrows "A," and moreover, whereby such ENs 14 are solely responsible for evaluating and/or determining whether to initiate and/or establish a BLE connection with the AP 16, as shown in the direction of arrows "B." That is, in no way is the AP 16 responsible for evaluating and/or determining any aspect or aspects of whether to make a connection between a respective AP 16 and a respective EN 14, and whereas such aspect or aspects, rather, are solely evaluated and/or determined by the EN 14 so that the EN 14, itself, is enabled to then solely initiate and/or establish the aforementioned connection, if doing so is deemed appropriate by the EN 14. Herein, the term, "initiate" means taking any initial steps or enacting any initial procedures, and the terms, "establish," or "established" mean taking any steps or enacting any procedures related to whether to cause and/or maintain a connection between an AP 16 and an EN 14, and thereafter making and/or maintaining such connection.

Figure 3:
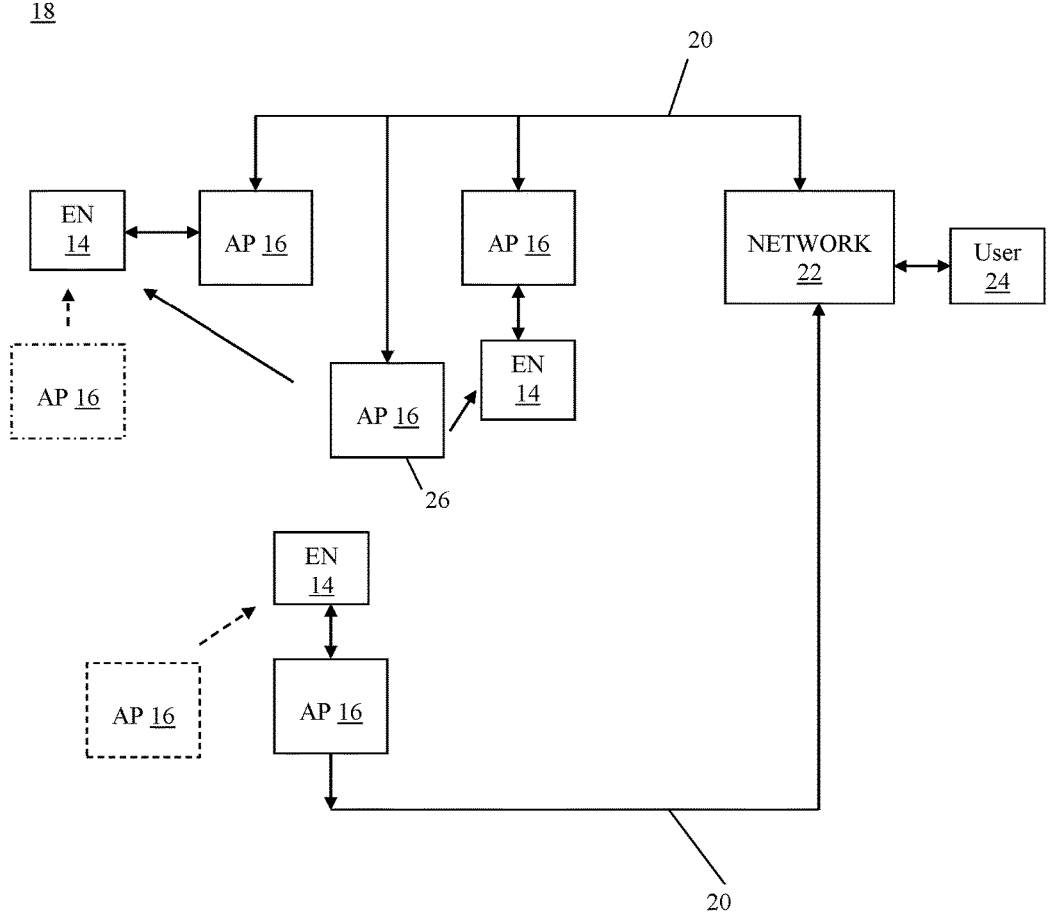
FIG. 3 is an illustration of a BLE-enabled network in accordance with FIG. 2.
Figure 4:
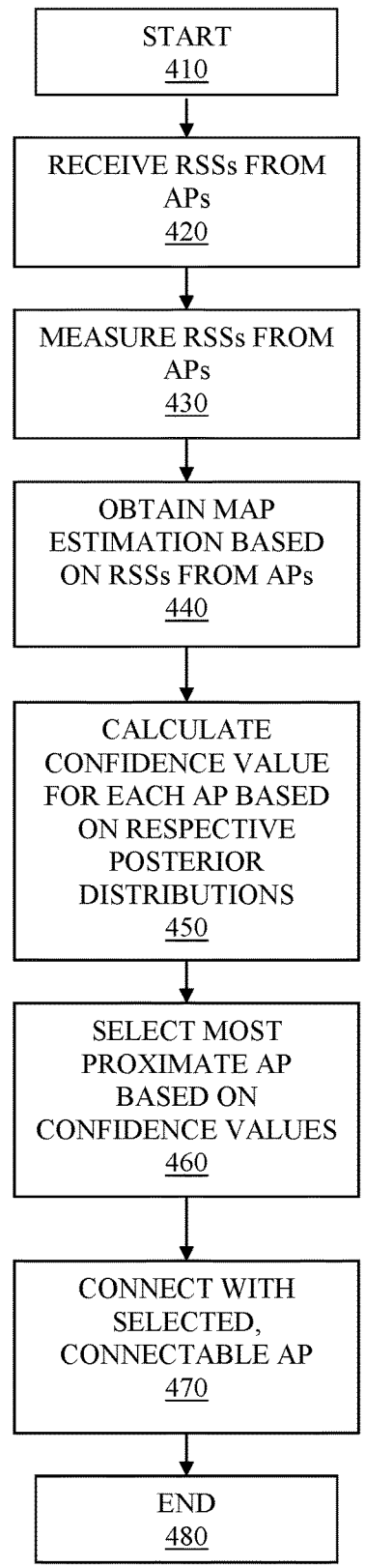
FIG. 4 is a sequence diagram of proximity association of a BLE EN with a BLE AP, in accordance with FIG. 3.
Figure 5:
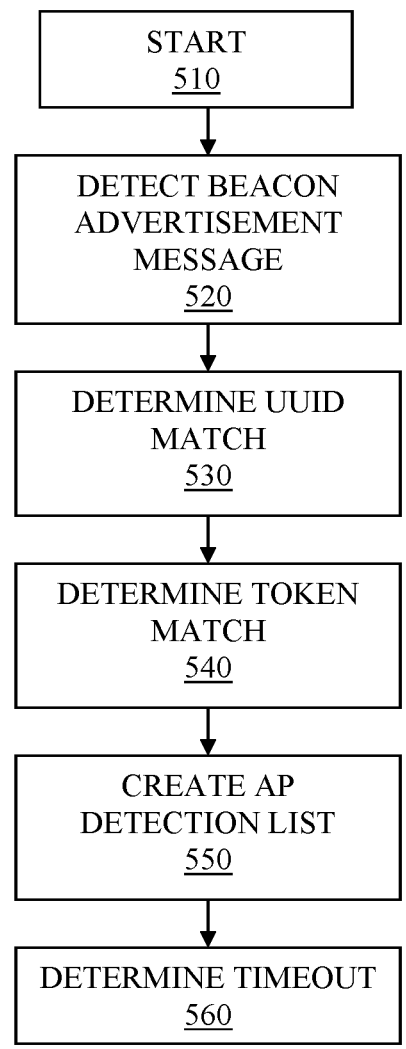
FIG. 5 is a sequence diagram of detection, by a BLE EN, of a BLE AP, in accordance with FIG. 3.
Figure 6:
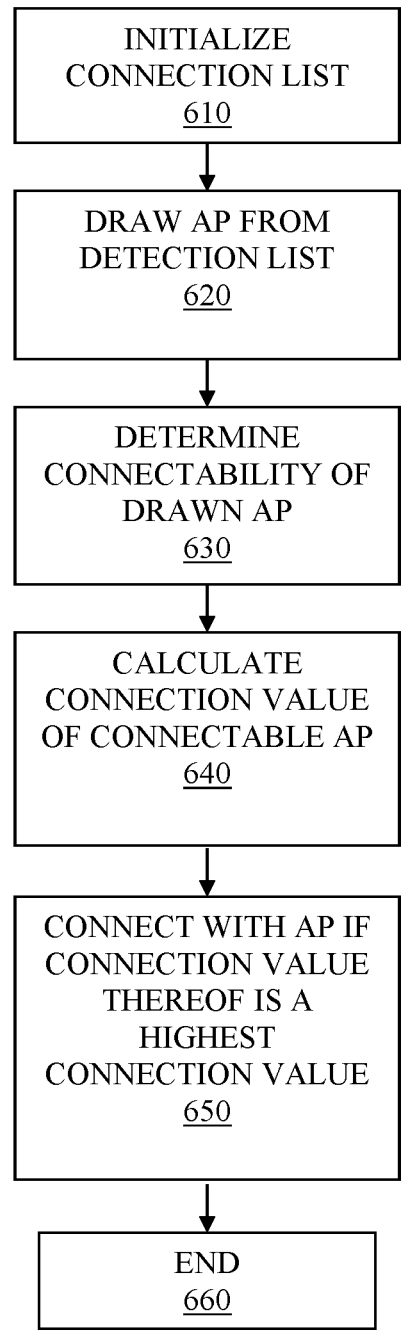
FIG. 6 is a sequence diagram of connection, by the BLE EN, with the BLE AP, in accordance with FIGS. 3 and 5.

FIGS. 3-6 and their accompanying descriptions below address various manner of associating an EN 14 to an AP 16. Therein, FIG. 3 illustrates a BLE-enabled network and communications system thereof, FIG. 4 illustrates a manner of proximity association of a BLE EN to a BLE AP, FIG. 5 illustrates a manner of detection, by a BLE EN, of a BLE AP, and FIG. 6 illustrates a manner of connection, by a BLE EN, with a BLE AP. Throughout, it is to be understood that an EN 14 does not, at any time, transmit to an AP 16 its location, but rather, the location of the EN 14 may be determined by relative association of one or more APs 16.

Specifically, FIG. 3 illustrates a BLE-enabled network 18 and communications system thereof according to the present embodiments in which ENs 14 detect a received signal strength (RSS) of all beacon advertisement messages transmitted from the APs 16, solely determine proximity with respect to the APs 16, and further, solely initiate and establish all connections therebetween the ENs 14 and APs 16, in response to having evaluated and/or made a decision with respect to, for example, such RSS, information contained in the beacon advertisement message, and/or other information, as discussed below in regard to FIGS. 4-6. Once a connection between an EN 14 and an AP 16 is made, data such as, optionally, identifying information, other than location information, of the EN 14 and identifying information of, other than the connected AP 16, the most proximate AP 16, and contained information of the EN 14 including, for example, sensory information thereof, may be transferred to the respective AP 16 for delivery through a backhaul 20, implemented by a cellular, WiFi, or Low Power Wide Area Network (LPWAN) configuration, to a network or cloud service 22 for transfer to an end user terminal 24, such as a personal computing or other electronic device enabled to convey the aforementioned information. Pertinent identifying and/or location information of the APs 16 are known to the network 22. Such network or cloud service 22 includes any one of available data and connectivity platforms to allow users of nodes within network 18 to, for instance, manage and distribute information pertinent to the nodes and/or information desired in the administration of the nodes. An example of such a platform is CONDUCTOR, available from Link Labs, Inc. of Annapolis, Md.

As mentioned, EN 14 may transmit identifying information of the AP 16 which is most proximate to the EN 14. Such AP 16 may or may not be an AP 16 which is connectable to the network 22, as is explained below. In these regards, it is to be understood that an AP 16 is connectable if able to connect to the network 22 via backhaul 20, and as non-connectable if unable to make such connection. For instance, non-connectable APs 16, which may or may not be present in the network 18 according to FIG. 3, are shown in dashed lines, as are transmissions of their beacon advertisement messages.

Further, it is to be understood that, while communications between an EN 14 and AP 16 are discussed herein in the context of the BLE protocol, it is contemplated that such communication may also be optionally achieved according to another wireless protocol, as appropriate. Also, it is to be understood that EN 14 and AP 16 are exemplary of first and second network nodes, respectively, which may be similarly configured as are EN 14 and AP 16 to carry out communications with respect to the BLE networking described herein and/or according to the other, appropriate wireless protocol discussed above.

In an exemplary case in which a respective EN 14 is mobile, the EN 14 is configured with an estimator comprising appropriate software and/or hardware for estimating proximity to a given AP 16, based on RSS, and is also configured with appropriate software and/or hardware for performing all operations associated with initiating and/or establishing a connection with an AP 16.

The estimator conducts a Bayesian Estimation, and specifically a maximum a posteriori (MAP) estimation for each AP 16 encountered by the mobile EN 14 at the time of the encounter, i.e., at the time of receipt of a single or multiple beacon advertisement messages, so as to account for either a single RSS, or alternatively, multiple RSSs. In other words, the MAP estimation may reflect either (1) a single RSS at the time of receipt of a beacon advertisement message from the respective AP 16 or (2) in order to mitigate RF hopping, a predetermined number of consecutive RSSs, e.g., five RSSs, resulting from multiple beacon advertisement messages from the respective AP 16. Furthermore, the EN 14 and its estimator may also be configured to undertake the MAP estimation at any time during operation of the EN 14. The estimation is given by the following Equation (1), $$p(x_t|y_{1:N}) = p(y_{1:N}|x_{1:N}) \int p(x_t|y_{t-1}) p(x_{t-1}|y_{t-1}) dx_{t-1}. \quad \text{Equation (1)}$$

In this way, the posterior distribution, $p(x_t|y_{1:N})$, for a given proximity between a particular EN 14 and AP 16 pair at time, t, is determined. In particular, such determination is made by advancing the next most previous posterior, $p(x_{t-1}|y_{t-1})$ from time, t−1, to the current time, t, given $p(x_t|y_{t-1})$. It is contemplated that a variance of the previous estimate, $p(x_{t-1}|y_{t-1})$, is increased by a predetermined rate. Accordingly, a new posterior estimate may be obtained based on all observations by an EN 14 in accordance with Equation (2), as follows:

$$p(y_{1:N}|x_{1:N}) = \prod_{i=1}^{N} p(y_i|x_i). \quad \text{Equation (2)}$$

Therein, $x_i$ represents a variable distance from an EN 14 to an AP 16, $y_i$ represents a RSS of a single beacon advertisement message or RSSs of several beacon advertisement messages, and N represents a number of observations, i.e., a number of received beacon advertisement messages. In this regard, the highest value, or minimum variance, distribution is chosen as the MAP estimate.

Once the MAP estimate is obtained, a confidence value, representing a level of expectation that a respective AP 16 is most proximate to the EN 14, is calculated for each AP 16 encountered by the EN 14, based on the estimated posterior distribution and Equation (3) below, and insofar as a 10 dB predetermined variance in RSS is set as an optional, acceptable variance therefor:

$$P_{\overline{10\,dB}} = 1 - 2Q\left(\frac{10\,\text{dB}}{\sigma_{posterior}}\right). \quad \text{Equation (3)}$$

Thus, it is to be understood that another variance level could be set as the predetermined variance depending upon, for example, device configuration(s) of one or more of the AP 16 and EN 14.

Selection of which AP 16 is most proximate to the EN 14 is determined as that AP 16 which yields the highest confidence value. However, if a further AP 16 yields a next most confident value corresponding to a predetermined tolerance for the confidence value, selection of the AP 16 that is most proximate to the EN 14 is determined from among all of the APs 16 which have broadcast a beacon advertisement message received by the EN 14. Still further, a signal strength from a respective AP 16 may be adjusted, in accordance with an adjustment factor included in the beacon advertisement message, to confer exclusive selection thereof by the EN 14, i.e., any other AP 16 whose beacon advertisement message the EN 14 has received is excluded from being considered as being most proximate to the EN 14. It is to be understood, that the estimator of a particular EN 14 may be configured to create a statistical fingerprint of AP 16 associations so as to optimize interpretation of future association patterns.

FIG. 4 sets forth a sequence of the above proximity determination enabling association of a respective EN 14 to a respective AP 16.

Therein, flow begins at decision block 410 and proceeds to decision block 420 at which an EN 14 receives a RSS from one or more APs 16. Thereafter, at decision block 430, the EN 14 measures the RSSs. At decision block 440, the estimator, which is configured integrally with the EN 16, calculates a MAP estimation for each of the RSSs. Subsequently, at decision block 450, EN 14 calculates a confidence value from each of the estimated posterior distributions. At decision block 460, the AP 16 yielding a highest confidence value is selected as the most proximate AP 16 to the EN 14. Flow then proceeds to decision blocks 470-480 in response to the selection by the EN 14. At decision block 470, EN 14 records the selection of the AP 16 according to identifying information thereof, including, for example, its network address or other appropriate networking identifying information. At decision block 480, the proximity association process ends.

Furthermore, it is contemplated that EN 14 may modulate its behavior depending upon certain conditions. For example, EN 14 may vary the frequency with which it conducts its MAP estimate depending upon whether the EN 14 is stationary or moving. That is, EN 14 may perform its estimation more frequently if it is moving, and less often if it is stationary. Still further, EN 14 may be configured to perform some predetermined action depending upon whether it is at a predetermined location (e.g., activate a light-emitting device (LED) or alarm) and/or whether no further AP 16 is detected (e.g., deactivate a device).

Additionally, and in accordance with FIGS. 5-6, the decision as to which AP 16 a mobile EN 14 should connect with, and to which it may transmit the identifying information of the most proximate AP 16, is determined based on attainment of a highest connection value calculated by the mobile EN 14. That is, as a mobile EN 14 moves in proximity to one or more APs 16, the value of connection with any one of the APs is assessed based on several components including the confidence value, in accordance with FIG. 4, and an associated weighting factor, a network loading value and an associated weighting factor, and an association factor of the broadcasting AP 16, and is given by the following Equation (4):

$$\sigma = \alpha \cdot P + \beta \cdot L + \gamma, \text{ in which} \quad \text{Equation (4)}$$

α represents the connection value, as an absolute value, a represents a weighting factor assigned to the confidence value calculated by the EN 14, P represents the confidence value, β represents a weighting factor assigned to loading of the connected network, L represents a loading value of the connected network and is included in the beacon advertisement message, and γ represents an association factor for a respective AP 16, such that γ equals zero if the EN 14 has not made a previous connection with the respective AP 16 and equals a predetermined highest value if the respective AP 16 is the AP 16 with which the EN 14 has made a most previous connection.

In this way, an EN 14 that moves among various APs 16, which may or may not be connectable to the network 22, may determine an optimal connection among such APs 16 based on the aforementioned components yielding the highest connection value in accordance with Equation 4.

Once such connection is made, as indicated by the exemplary double arrows of FIG. 3, the connected AP 16 may receive from the EN 14 the identifying information of another AP 16 that is most proximate in a case in which the connected AP 16 has been determined to have attained the highest connection value, but not the highest confidence value. The other, most proximate AP 16 may be any of the following: a non-connectable AP 16, or another connectable AP 16, indicated at 26 in FIG. 3, to which connection has not been made due to it not achieving the highest connection value. Thus, it is to be understood that the consideration of the confidence value in Equation 4 increases the likelihood that the most proximate AP 16 is the one to which EN 14 connects. However, this scenario is not certain given connectability of one or more APs 16 and other considerations used in determining the connection value according to Equation 4.

The manner of determining the above optimal connection at the mobile EN 14 is demonstrated by the flow of FIGS. 5-6. FIG. 5 provides a sequence for scanning for detection of a beacon advertisement message respectively transmitted from one or more APs 16, while FIG. 6 provides a sequence for determining an AP 16 with which the EN 14 should connect, based on the above-discussed connection value, a, as determined in accordance with Equation 4.

Flow begins in FIG. 5 at decision block 510 and proceeds to decision block 520 at which EN 14 scans for and detects a respective beacon advertisement message from one or more APs 16, whose identifying and/or location information is known to the network 22. Thereafter, at decision block 530, EN 14 processes a detected beacon advertisement message to determine a Universally Unique Identifier (UUID) match wherein identifying data of the AP 16 broadcasting the beacon advertisement message is confirmed as belonging to the network 22. From there, flow proceeds to decision block 540 to determine and confirm a token match. If a match is confirmed at 540, the broadcasting AP 16 is, at decision block 550, added to a list of detected APs 16 ("detection list") for which decisions at blocks 530 and 540 have been confirmed. During operation of the estimator at decision blocks 520-540, the estimator of EN 14 calculates respective confidence values for the detected APs, and records each of the respective confidence values for the detected APs 16 such that attained confidence value is associated with a respective, detected AP 16 when such AP 16 is added to the detection list, and also its selection of the most proximate AP 16. Thereafter, it is determined at decision block 560 whether the scanning operation has timed out. If not, as in the case of negative decisions at decision blocks 530 and 540, scanning continues. If the scanning operation has timed out, flow proceeds, as shown in FIG. 6, to determine which AP 16, from among the detection list, the EN 14 should connect.

Based on a timeout having occurred and the detection list, flow then proceeds, from decision block 560, to decision block 610 of FIG. 6 so as to initialize a list of APs 16 to which the EN 14 should connect (so as to provide a "connection list"). Once this connection list is initialized, an AP 16, with its associated confidence value, is drawn from the detection list, at decision block 620, at which point it is then determined, at decision block 630, if such AP 16 is connectable to the network 22 of FIG. 3, for example. If the drawn AP 16 is connectable, flow then proceeds, with respect to such drawn AP 16, to decision block 640 whereat a connection value therefor is calculated in accordance with Equation (4). Flow is then iterative through decision blocks 620-640 until detection list provided at decision block 550 is empty. From among respective connection values calculated at decision block 640, EN 14 selects and connects with, at decision block 650, the AP 16 having a highest connection value in accordance with Equation (4), and proceeds to an end at decision block 660 once connection is established.

During that connection, however, identifying information, other than location information, of an AP 16 which is determined to be most proximate to the EN 14, but non-connectable to the network 22, may be transmitted, by the EN 14, to the AP 16 with which the aforementioned connection has been established.

In this way, the aforementioned proximity determination according to the discussed confidence value serves the dual purpose of both determining which AP 16, whether the AP 16 is connectable or non-connectable, is most proximate to an EN 14, and providing a basis for determining which AP 16 the EN 14 should connect. That is, the AP 16 with which the EN 14 ultimately connects may receive identifying information of a non-connectable AP 16 that is most proximate to the EN 14 so that a relative determination of the location of the EN 14 may be determined with reference to this latter, non-connectable AP 16. In this way, the granularity of the proximity determination above is increased such that non-connectable APs 16, and not only connectable APs 16, are each considered by the estimator of EN 14 so as to render available a more accurate AP/EN proximity association.

Accordingly, as mobile EN 14 moves in and out of range of one or more APs 16, connection with a respective one thereof may be made based upon the aforementioned confidence and connection values, such that the connected AP 16 likewise may yield a highest confidence value so as to be most proximate to the EN 14, and represent the optimal connection according to Equation (4). In this case, such proximity will be made known to the user 24 by virtue of the established connection and the lack of any other AP 16 identifying information being transferred to the network 22.

Such ability of a EN 14 to select and connect with a specified, respective one of APs 16 removes the shortcomings of conventional BLE networking by enabling a mobile EN 14 to have the autonomy necessary to initiate and/or establish connection with an AP 16 solely in response to its own evaluation and decision making with respect to aspects contributing to the aforementioned proximity association, connection value and/or other information associated with the EN 14. For instance, such other information may optionally include one or more parameters relating to operation of the EN 14.

In removing the aforementioned shortcomings, it will be apparent that the embodiments discussed herein eliminate the conventionally overwhelming number of advertisements transmitted by peripherals in conventional BLE networking. That is, the present embodiments substantially reduce the number of advertisements occurring at a given time by virtue of the BLE role reversal, discussed herein, in which plural end nodes receive, rather than transmit, advertisements in the form of beacon advertisement messages from one more access points.

Once connected, the EN 14 may then transfer its own identifying information, other than location information, and identifying information of the most proximate AP 16. In this way, when information of an AP 16 other than the connected AP 16 is not transferred, it will be understood that the connected AP 16 is most proximate to the EN 14. Concurrently with the transfer of the above information, the EN 14 may also transfer one or more of its contained information including sensory information, access information, notification information, alarm information, and any other status and/or content information thereof as may be applicable to its particular configuration. For instance, it is contemplated that EN 14 may transfer any of the aforementioned types of information so as to be applicable to such environments including a workplace or other type of commercial environment in which commerce is a purpose, a residence, and a medical facility or other facility in which tracking of persons or objects is necessary and/or desired.

The following examples describe instances of associating a particular end node (EN) 14 to a particular access point (AP) 16. Further, such examples are set forth in the context of the BLE-enabled network 18 of FIG. 3 and with the exemplary understanding that an EN 14, which may be defined as a BLE tag and/or a BLE tag attached to or associated with a particular object, is seeking association with a BLE AP 16 that is configured to report information of the tag to an end user 24 via backhaul 20 and network 22. In these regards, it is contemplated that EN 14 and AP 16 may be embodied as being any stationary and/or mobile nodes of an appropriate wireless network, and as being capable of operating according to a BLE protocol or other protocol in which such nodes may operate as respective first and second nodes according to any of FIGS. 4, 5, and/or 6. Also, in these regards, it is to be understood that a respective EN 14 may be configured to calculate its confidence and connections values at the same time, or, at different times. It is to be understood that EN 14 may undertake any of the processes of FIGS. 4-6 at any time, whether the EN 14 is mobile or stationary. Thus, the EN 14 is configured to optimize, at least, a rate at which connection may be established, with respect to, at least, proximity of such connection as well as the efficiency of such connection, as will be understood based on the components of Equation (4).

In a first instance, it is contemplated that such tag is attached to an object, such as a hospital bed for which it is desirous to know the location thereof at any given point in time when it is moving throughout a hospital environment. Thus, assume that the hospital bed, with the tag attached thereto, is transient throughout the hospital, moving from floor to floor and from room to room, as the case may be when a patient is to undergo a particular procedure. At any given point in time, as the bed moves from one location to the next, its whereabouts may be tracked through monitoring achieved by the BLE communications system disclosed herein.

More specifically, as the hospital bed may move throughout a particular floor, it contemplated that it will move among a number of APs whose location is known to the hospital network. As that travel occurs, the tag attached to the bed will scan for beacon advertisement messages transmitted from the various APs. Upon receipt of the transmitted signals, the tag is configured to conduct the MAP estimation discussed hereinabove and calculate a highest confidence value for the AP that is in closest proximity at a given point in time and which may or may not be connectable to the hospital network. The tag is further configured to connect with a particular connectable AP having a highest connection value, as shown by the exemplary double arrows extending between an exemplary EN 14 and AP 16 of FIG. 3, so that the identifying and other information of the closest proximity AP may then be transferred to the end user. In this way, as the bed and attached tag may continue to move, the process of determining proximity of the tag to both connectable and non-connectable APs continues until, optionally, such point in time when the bed and attached tag are stationary such that identifying information of a further, different AP need not be reported.

More particularly, and continuing with the example scenario above, the attached tag is alternatively, and optionally, configured to conduct a scan of broadcasting APs and assess their UUID and token information so as to qualify those APs to be included on a detection list resulting from the scan and from which connection with a specified one thereof will occur in order to transfer the tag's identity, identity information of the AP to which the tag is most proximate, and/or contained information of the tag to an end user. Once this detection list is compiled and scanning is completed, embodiments of the present disclosure contemplate the tag being configured to initialize a connection list of APs, from among the APs compiled on the detection list. Once initialized, the tag is further contemplated to conduct a determination of whether an AP is connectable to the network 22 via backhaul 20 so as to be able to transfer information of the tag to an end user desirous of knowing the location of the hospital bed. Each connectable AP is then evaluated as to its associated connection value in accordance with Equation (4) above.

More specifically, the connection value for each AP, that is determined to be connectable to the network 22, is assessed based on components comprising a confidence value representing a level of expectation that a respective AP is most proximate to the tag and an associated weighting factor, a network loading value and an associated weighting factor, and an association factor of the AP. In regard to the association factor, it is contemplated that such factor be deemed to have a value of zero if the tag has not connected with the AP being evaluated, and to have a highest value if the tag has had its most recent connection with that AP. In this way, those connectable APs for whom a connection value has been evaluated by the tag will yield an AP having a highest connection value. As such, the tag will then select that AP as the AP with which to initiate and establish a connection enabling the transfer of pertinent information of the tag, including identity information of the AP to which the tag is most proximate, to the end user.

Figure 7:
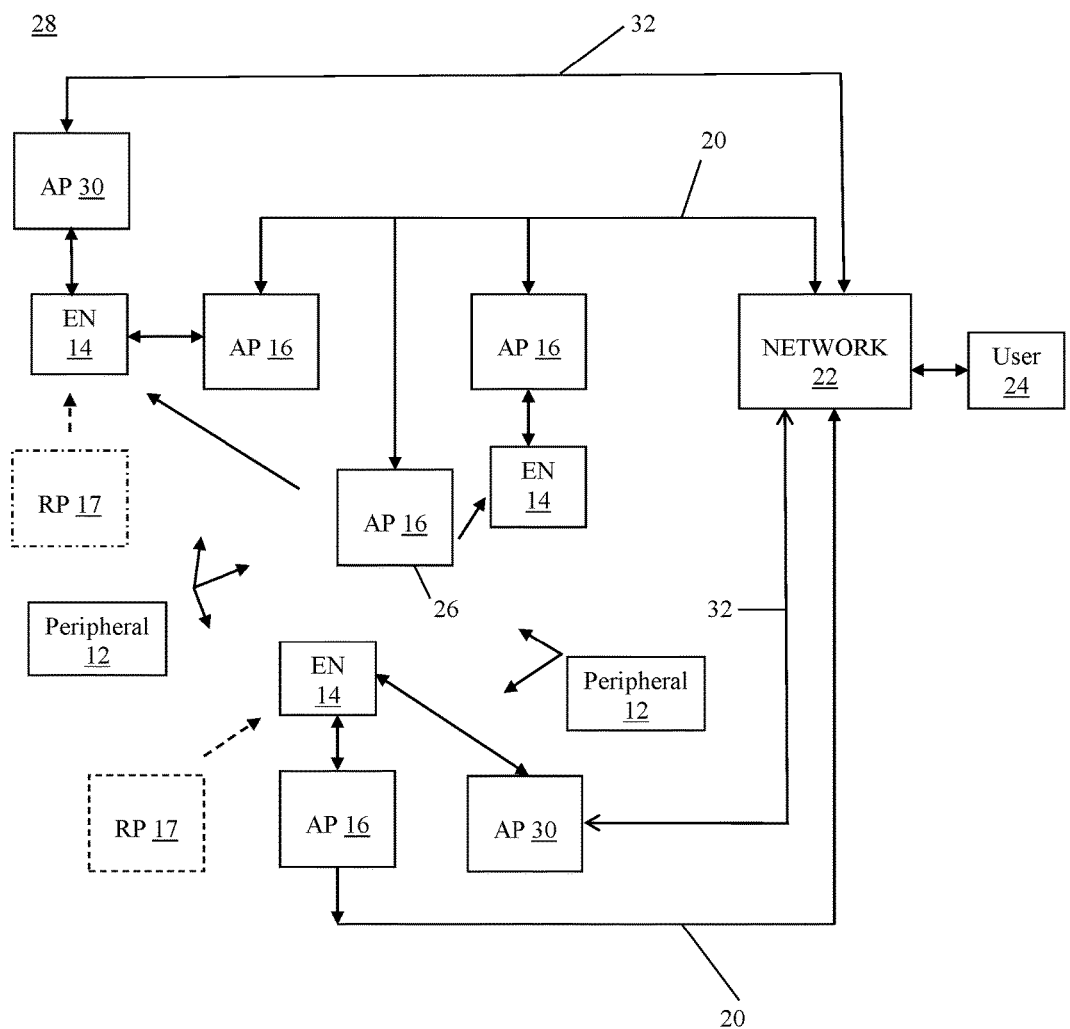
FIG. 7 is an illustration of a BLE-enabled network showing circumstances for interactions between a BLE EN and a mobile BLE AP.

When considering the above embodiments, it will be understood that APs 16, as shown in FIGS. 3 and 7, are stationary with respect to their location, such that a location of an EN 14 becomes attributed to the EN 14 by virtue of its proximity and/or connection to a particular stationary AP 16, the location of which is known to the network 22 as being fixed. Accordingly, in the context of determining a location of an EN 14 with respect to a final, target destination TD at which the EN 14 is expected to arrive, the following discussion addresses a manner of determining the incremental location of a respective EN 14 as that EN 14 is in transit toward such final, target destination TD.

Figure 8:
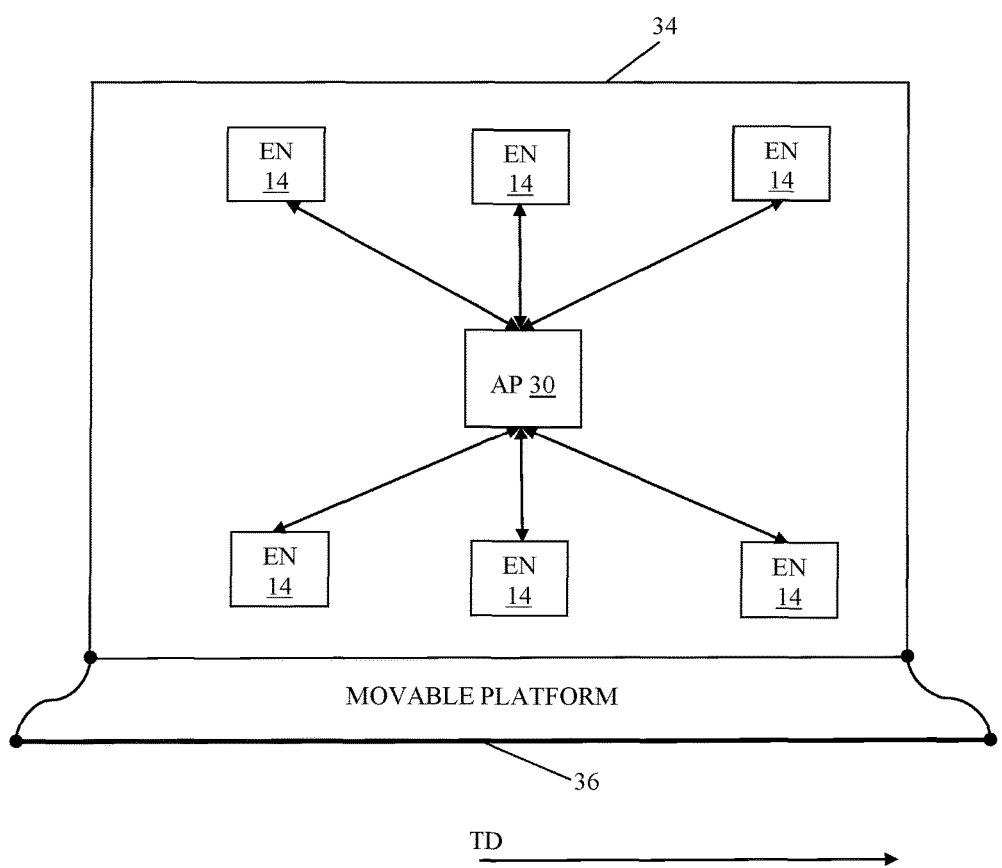
FIG. 8 is an illustration of collective movement of each a plurality of BLE ENs and at least one BLE AP.
Figure 9:
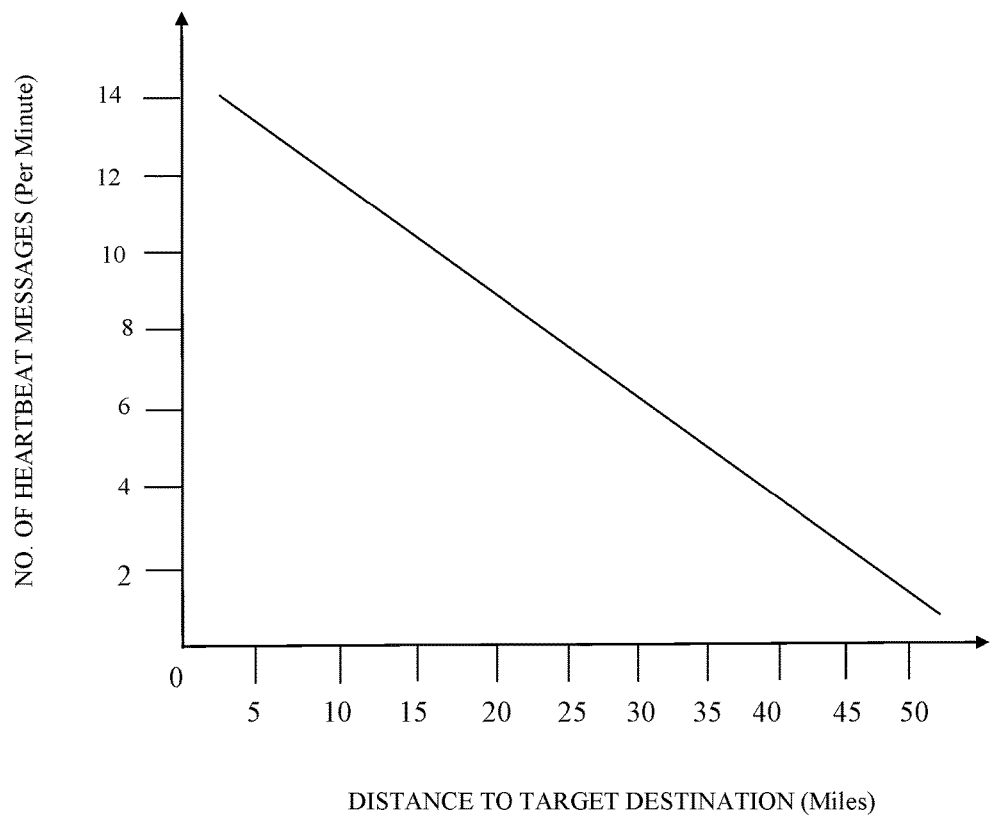
FIG. 9 is a graphical representation of, during collective movement of the plurality of BLE ENs and at least one BLE AP of FIG. 8, a number of heartbeat messages transmitted by one or more of the plurality of BLE ENs relative to a target destination known at the BLE AP.

In this regard, FIGS. 7-9 and their accompanying description contemplate the provision of a BLE-enabled communications system in which a location of one or more ENs 14 is determined with respect to a varying/variable location of an AP 30. That is, the AP 30 which one or more ENs 14 may determine as being most proximate, and to which such one or more ENs 14 may connect is mobile. In this way, and in accordance with a mobile AP 30 obtaining a highest confidence value in accordance with Equations (1)-(3) and a highest connection value in accordance with Equation (4) as explained above, a synchronicity of location determination among each of the one or more ENs 14 and the mobile AP 30 is provided. Further, as will be explained, such location determination is achieved by attribution of a location of a mobile AP 30 to an EN 14, with respect to a final, target destination TD so that, for instance, the whereabouts of a particular EN 14 may become known incrementally at points along a route toward the final, target destination. Alternatively, a location of an EN 14 may be determined through attribution of one or more random locations of the mobile AP 30.

Referring now to FIG. 7, there is provided a BLE-enabled network 28, which is similar to the network of FIG. 3. However, network 28 further includes exemplary battery-powered mobile APs 30, in which two thereof are shown such that in other exemplary embodiments only one mobile AP 30, or several additional mobile APs 30 may be incorporated. Each mobile AP 30 is configured to comprise its own wireless backhaul 32, implemented by any appropriate hardware and/or software therefor, for delivery of information to and from network 22, and which may comprise any of, for example, Global System for Mobiles (GSM), or Long-Term Evolution (LTE), including Cat-M1 or NB-IoT.

Additionally, and while each mobile AP 30 broadcasts its beacon advertisement message in a similar manner as does a respective AP 16 of FIG. 3, the aforementioned beacon advertisement message is provisioned, i.e., configured, by network 22 to include one or more parameters that indicate that a respective AP 30 is mobile. In other words, a mobile AP 30 is set to indicate that its location is not fixed or stationary. This is in contrast to beacon advertisement messages sent from stationary APs 16 of network 28, which are configured by the network 28 to indicate that such APs 16 are stationary.

Furthermore, such mobile AP 30 may be likewise provisioned by network 22, or otherwise such as by initial internal programming, to comprise a location of a final, target destination TD.

With respect to determinations by an EN 14 of which mobile AP 30 is most proximate, in accordance with Equations (1)-(3), network 28 functions differently than that of FIG. 3. More particularly, network 28 confers a bias in favor of stationary APs 16. That is, upon receipt of a beacon advertisement message from at least one stationary AP 16, an EN 14 makes its proximity determination solely on the basis of messaging from one or more stationary APs 16 so as to disregard messaging from any mobile AP 30 that may be within range of the EN 14 so as to receive associated advertisements. In this way, an end user, through communication with network 22, may obtain a location of an EN 14, i.e., the attributed location of a particular stationary AP 16, in which that location is already known by the network 22 to be a fixed location.

However, an EN 14 of network 28 will evaluate connection to the network 22, in accordance with Equation 4, by considering both stationary APs 16 and mobile APs 30 as potential points for connection. In other words, once an EN 14 has determined its connection in accordance with Equation 4 and has connected to either a stationary AP 16 that is within range of the EN 14 or a mobile AP 30 that is within range of the EN 14, the identifying information, i.e., the media access control (MAC) address, of the most proximate AP 16 or AP 30, as determined by the EN 14 in accordance with Equations (1)-(3), is transmitted by the EN 14 to the network 22 through the determined connection, and then attributed by the network 22 as the location of the EN 14. As previously discussed, an EN 14 makes its proximity determination from among (1) only stationary APs 16 when a mobile AP 30 is also within range of the EN 14, or (2) only mobile APs 30 when no stationary AP 16 is within range of the EN 14.

Variable positioning of a mobile AP 30 is determined with the assistance of hardware configured on the AP 30 itself. Such hardware may comprise any one or more of a conventional Global Positioning Satellite (GPS) receiver, a conventional WiFi receiver, and a conventional cellular modem. As will be explained below, positional coordinates of the mobile AP 30, such as its latitude and longitude, are obtained for the purpose of network 22 attributing those coordinates to an EN 14, which has determined that the mobile AP 30 is most proximate and/or to which connection therewith should be established.

When configured with a GPS receiver, a mobile AP 30 determines latitude and longitude as would, for example, a smartphone or other computing device executing GOOGLE MAPS or another known global positioning application.

When configured with a WiFi receiver, a mobile AP 30 is enabled to obtain, for one or more wireless local area networks (WLANs), such as a WiFi network or networks, received signal strength indicators (RSSIs) for detected networks, service set IDs (SSIDs) representing a name of a particular WiFi network, and basic service set IDs (BSSIs) representing the MAC address of access points within the detected network. With this information, and particularly BSSIs for detected networks, the mobile AP 30 is then able to communicate detected addresses to network 22. Network 22 then coordinates access to positioning databases for WiFi networks, including, for example, that which is administered by GOOGLE. Through this coordination and matching of these addresses, a relative location of the mobile AP 30, comprising a latitude and longitude for the detected addresses, may be determined and attributed, by network 22, to any mobile AP 30 for which an EN 14 conducted its proximity and connection determinations.

When configured with a cellular modem, the cellular ID (CID) of the base transceiver station (BTS) with which the mobile AP 30 is in communication is delivered upstream to the network 22. There, network 22 accesses a mapping of the BTS as administered by a cellular provider with rights to the BTS, such as VERIZON, AT&T or similar network operators. With this mapping, a relative location of the mobile AP 30, comprising the latitude and longitude of the communicating BTS, may be learned and attributed, by network 22, to any mobile AP 30 for which an EN 14 conducted its proximity and connection determinations.

When configured with any combination of mobile AP 30 location determining hardware including the GPS receiver, the WiFi receiver and the cellular modem, as described above, network 22 is configured to calculate and determine the relative location of the mobile AP 30 within a predetermined tolerance of positional latitude and longitude coordinates. Such determination may occur, for instance, in a case in which the network 22 determines a location of a mobile AP 30 using a combination of, for example, GPS coordinates and WiFi derived coordinates, though other combinations are contemplated.

Relative to communications between an EN 14 and a mobile AP 30, network 22 is configured to message an EN 14, through a mobile AP 30, in order to provision certain ones of settings of the EN 14. Among these settings are aspects of a heartbeat message, i.e., a message sent by the EN 14 to the network 22 which informs the network 22 of the communication state of the EN 14. As examples, such aspects may include one or more of a battery configuration, a heartbeat message interval defining a period of time between transmissions of heartbeat messages, "scans per fix" defining a number of scans to be conducted for every proximity location determination of a most proximate stationary AP 16 or mobile AP 30, as well as any update information in relation to any of the aforementioned aspects. A transmitted heartbeat message will include the MAC address of a most proximate stationary AP 16 or mobile AP 30.

The heartbeat message interval for a stationary EN 14 that is operational within network 18 of FIG. 3 need not be as short as, for instance, an EN 14 that is operational within network 28 of FIG. 7. This is the case since the relative location of an EN 14 of network 18 is known by virtue of its connection with a stationary AP 16, the location of which is maintained in network storage. In other words, a relative location attributed to an EN 14, owing to a fixed location of a stationary AP 16, is substantially invariable.

In contrast, a relative location of an EN 14 of network 28 is variable since, as has been discussed, such location is determinable as a function of a precise location of a mobile AP 30 that is determined by the EN 14 to be most proximate and/or to which connection should be established.

Accordingly, network 22 is configured to provision a heartbeat message interval of a mobile AP 30 differently, such that the aforementioned interval is substantially shorter than that of a stationary AP 16. Doing so is particularly useful whereby network 22 is therefore enabled to quickly learn of a relative location of an EN 14, resulting from an attributed location of a mobile AP 30. In this way, metrics associated with such location by an end user may be evaluated on an as-needed basis, or in real-time depending upon provisioning determined by the network 22. Such metrics may include, for instance and in a circumstance in which the EN 14 is associated with a package that needs to be tracked, a calculation of penalties owing to an overdue arrival time.

Referring to FIG. 8, there is shown an exemplary container 34 including an aggregation of ENs 14 which are communicable (as shown by the indicated arrows) with at least one mobile AP 30, each of which is configured to be provisioned by network 22. Container 34 may comprise any type of holding apparatus, including, for example, a crate, box, or other device capable of securely holding items in place and allowing for their removability. As shown, container 34 is attached to a movable platform 36 which may be directed in the direction of target destination TD. Movable platform 36 may comprise any type of structure enabled to support container 34, such as a bed or flooring of a delivery vehicle, prongs of a forklift like that which may be found in a warehouse or at a seaport having multiple loading docks. The direction of target destination TD may comprise any mappable direction, such that a location of container 34 and its contents may be determined with respect to that target destination by virtue of the GPS, WiFi, and cellular configurations available for a mobile AP 30.

Though only one container 34 is shown, it is contemplated that movable platform 36 may support several similarly configured containers 34. Likewise, one or more of the containers may contain multiple mobile APs 30.

Each of the ENs 14 and mobile APs 30 may be provisioned with respect to target destination TD so that a location of each may be accurately determined at a desired rate and time. That is, mobile AP 30 will be configured with the target destination, and the ENs 14 will each be configured with a heartbeat message interval and update rate therefor in recognition of receipt of beacon advertisement messages from one or more mobile APs 30. That is, the heartbeat message interval may be configured in accordance with the discussion provided below in regard to FIG. 9. More specifically, the heartbeat message interval may be configured by network 22 to decrease as a distance from the target destination TD decreases.

FIG. 9 provides a graphical representation depicting an exemplary scenario for a number of heartbeat message transmissions relative to a target destination TD of a mobile AP 30 and its associating ENs 14. Therein, such number of transmissions is shown as being the greatest when the mobile AP 30 and associating ENs 14 are nearest the target destination. This is, of course, due to a decreasing heartbeat message interval that results from approach of the mobile AP 30 toward the target destination TD.

While the relative proximity of the mobile AP 30 is indicated in terms of distance, i.e., miles, it is to be understood that other measurable parameters may be substituted such as, for example, units of time. Additionally, though location has thus far been discussed as the gauge for determining a setting of the heartbeat message interval relative to movement of the mobile AP 30, it should also be understood that other criteria, such as temperature or other sensory perceptibility with which an EN 14 may be equipped may also serve as a basis for the aforementioned setting. For instance, if an EN 14 is equipped with sensory perceptibility for, say, temperature, the EN 14 may be provisioned by network 22 to adjust its heartbeat interval upon the occurrence of a certain temperature or range thereof. Even more, adjustment of the heartbeat message interval may be a function of one or more flags set in the beacon advertisement message transmitted by the mobile AP 30 so that the EN 14 transmits its heartbeat message correspondingly.

The following examples describe instances of associating an EN 14 with a particular mobile AP 30, and thus, are specifically applicable in the context of network 28 of FIGS. 7-9 for enabling the transfer of information pertaining to an EN 14 and determining a location thereof while in transit between multiple locations.

A first use case includes a situation in which an inventory of select items contained within a shipping pallet is to be determined. When making such determination, it is important to know the location of various items held by the pallet. Accordingly, the embodiments herein contemplate attachment of an EN 14 to the items, as well inclusion of a mobile AP 30 onto the pallet, and in which the mobile AP 30 may be defined according to either Configuration A or Configuration B as described above. Thus, as the pallet moves between several locations and toward a target destination TD, an end user may become aware of the location of any one pallet item in response to heartbeat messages transmitted from the associated EN 14. As has been discussed, such heartbeat messages will, necessarily, include the MAC address of the mobile AP 30, and as a result of such inclusion, the location of the associated ENs 14 will become known due to attribution of the location of the mobile AP 30.

A second use case according to the disclosed embodiments contemplates tracking the location of goods which are to be hauled from place to place, and ultimately to a purchaser of the goods. Take, as an example, intended delivery of gas-filled tanks containing gases such as oxygen or nitrogen. In this example, it would be advantageous to both the seller and the purchaser to know both the location and condition of the tanks and their contents as the delivery process is undertaken. In order to provide and facilitate such knowledge, the present embodiments contemplate the attachment of an EN 14 to each tank, in which the EN 14 is enabled to assess parameters of a given tank including, for example, an amount of contained content, a pressurization thereof, and/or a temperature thereof. Additionally, the present embodiments also contemplate the inclusion of a mobile AP 30 within the truck carrying the tanks, as well a further mobile AP 30 embodied by the driver's smartphone configured to include an application that leverages the GPS, WiFi and cellular capabilities thereof. In this way, and in accordance with Equations (1)-(4) pertaining to determination of a most proximate mobile AP 30 and connection to that mobile AP 30 which garners a highest connection value, both a location of a given tank and information pertaining to the aforementioned parameters may be learned. This is true even as incremental movements of the mobile AP 30 occur from the truck to the target destination. For example, such location and pertinent information may be learned via the driver's smartphone as offloading of a particular tank from the truck and its delivery to the target destination occurs. This is the case as the associated EN 14 will likely become biased toward connection with the driver's smartphone given an expected close proximity, i.e. a few feet, from the tank being delivered as the tank is being carried to the target destination.

In a third use case, it is contemplated that in the above example the mobile AP 30 contained within the truck would not include connection to the network 22. As a result, such mobile AP 30 would serve merely as a reference point that may be reported by a particular EN 14 to the driver's smartphone. In this way, the whereabouts of the truck, the driver and the tanks carried by the truck may be known simultaneously. In each of the above use cases, and in others as may be applicable in accordance with the disclosed embodiments, it will be understood that non-receipt of a heartbeat message will indicate that it has moved out of range of one or more mobile APs 30. As such, the last reported location of an EN 14 may be deemed its final location.

With respect to the above-described embodiments, one or more of an EN 14 and a mobile AP 30 may be configured for detection of temperature, light, sound, pressure, humidity, density, moisture, acceleration, voltage, current, material content level and pressure, motion, proximity, magnetism, rotation, orientation, velocity and/or deviation from original condition.

Figure 10:
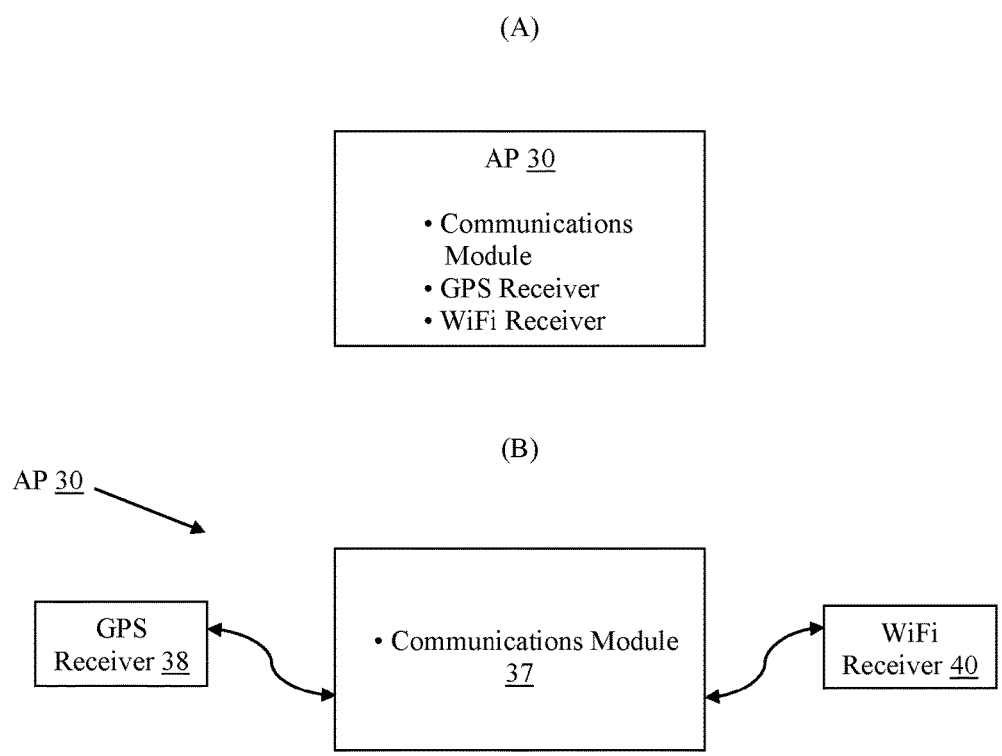
FIG. 10 is a block diagram illustrating alternative configurations of a mobile BLE AP according to embodiments herein.

As referenced above, a respective mobile AP 30 of network 28 comprises a wireless backhaul 32 enabling connection with the network 22. Further, and as is also referenced above, such mobile AP 30 may comprise one or more of a GPS receiver and a WiFi receiver. With reference to FIG. 10, Configuration A illustrates a mobile AP 30 in which each of a communications module, i.e., a modem, a GPS receiver and a WiFi receiver are included so as to enable determination of a location of the mobile AP 30, as described above. Alternatively, Configuration B illustrates a decentralization of Configuration A. In doing so, Configuration B includes a battery-powered BLE communications module/modem 37, and separate battery-powered BLE GPS and WiFi modules 38 and 40, in which each of these modules is configured to be communicatively coupled with the communications module 37, as shown by the arrows in FIG. 10. That is, upon determination of their pertinent information, the modules 38 and 40 are configured to transmit the same to the communications module 37 for relay to the network 22.

In this way, alternative Configurations A and B provide flexibility as to which thereof is more suitable for use in a particular situation in which it is desired to learn a location and/or information of an EN 14 to which the location of the mobile AP 30 is to be attributed. For instance, it may be the case that, due to physical constraints, Configuration A would not be suitable due to size, etc., while Configuration B would be appropriate.

The manner in which the mobile AP 30 according to Configuration A or Configuration B obtains its location differs with respect how positional coordinates are assigned. In this regard, FIGS. 11 and 12 show the steps to be implemented for Configurations A and B, respectively, for such assignment, as well as the attribution of a location of the mobile AP 30 to an EN 14.

Figure 11:
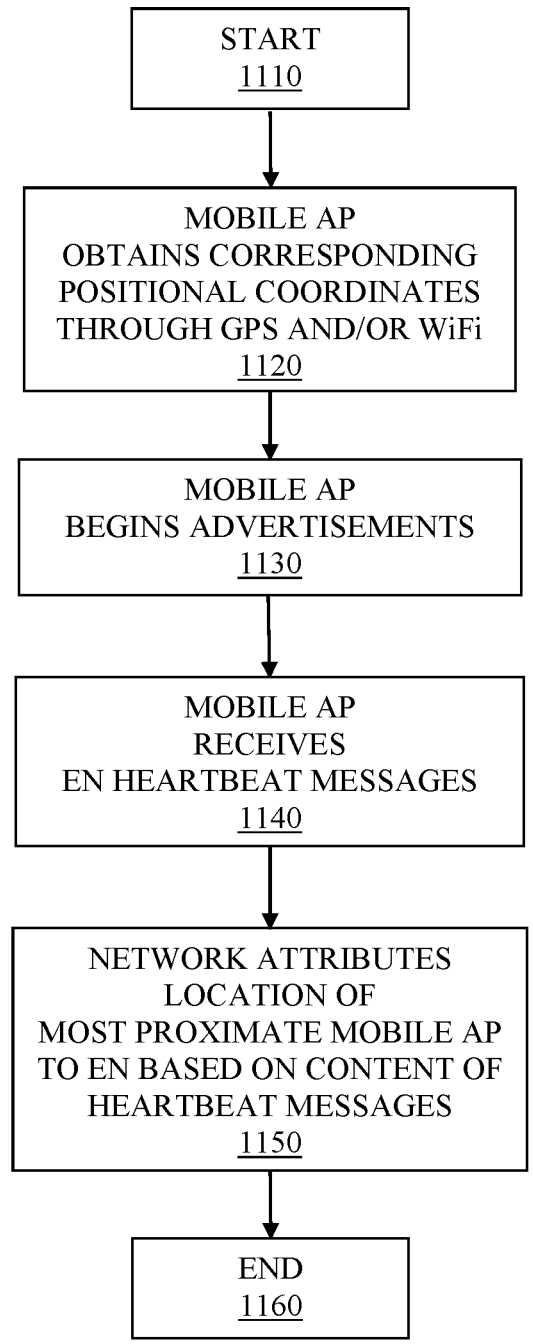
FIG. 11 is a sequence diagram demonstrating a manner of determining a location of a first configuration of the mobile BLE AP according to FIG. 10.

In referring to FIG. 11, assignment of positional coordinates to a mobile AP 30 according to Configuration A begins at decision block 1110, and proceeds to decision block 1120 whereat positional coordinates for the mobile AP 30 are obtained through either GPS and/or WiFi detection and transmitted to the network 22. At decision block 1130, mobile AP 30 begins its transmission of beacon advertisement messages for detection by one or more ENs 14. At decision block 1140, the mobile AP 30 receives heartbeat messages from one or more of the ENs 14. When transmitted from the mobile AP 30 to the network 22, a respective heartbeat message will include the MAC address of the mobile AP 30. Thus, at decision block 1150, network 22 is then equipped to attribute the location of the mobile AP 30 to the transmitting EN 14, whereas the process then ends at decision block 1160. In this way, a location of the EN 14 may be learned through attribution of the location of the mobile AP 30, wherein such location defines the mobile AP 30 as that through which the EN 14 connected to the network 22, as well as that which is perhaps most proximate to the EN 14.

Figure 12:
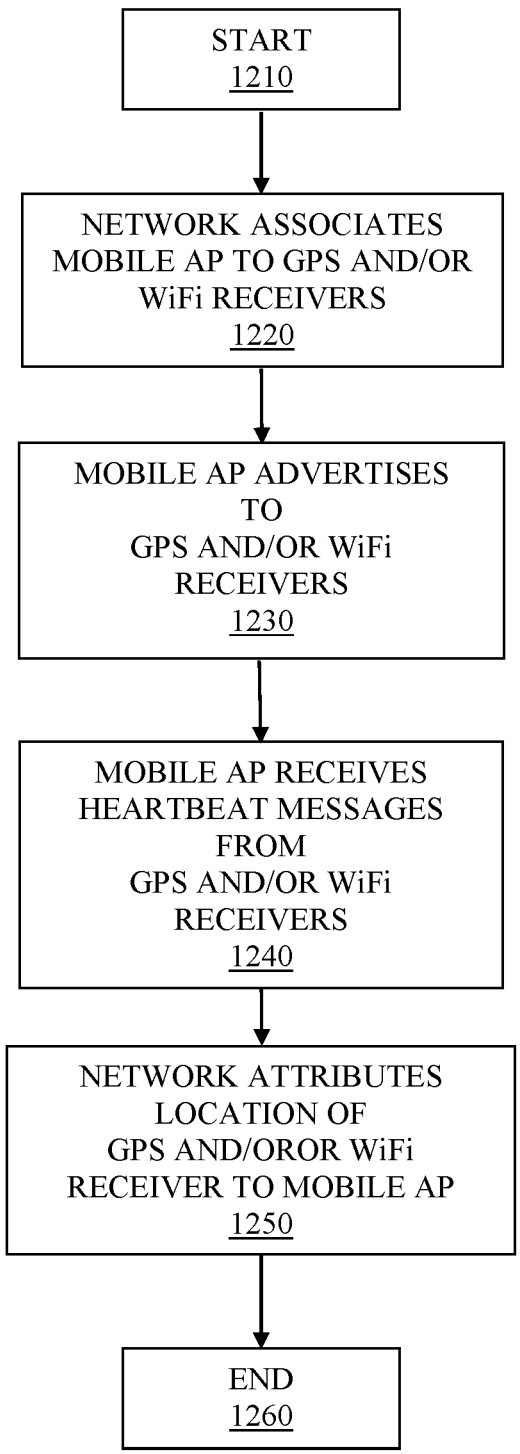
FIG. 12 is a sequence diagram demonstrating a manner of determining a location of a second configuration of the mobile BLE AP according to FIG. 10.

In referring to FIG. 12, there is shown a process for determination of a location of a mobile AP 30 according to Configuration B, and subsequent determination of a location of an EN 14. The process begins at decision block 1210, and proceeds to decision block 1220 whereat network 22 first associates a MAC address of the GPS module 38 and/or the WiFi module 40 to the communications module 37. That is, the association of the modules 38 and 40 is performed preliminarily such that the grouping of modules 37, 38 and 40 is known by the network 22. At decision block 1230, communications module 37 advertises to either one or both of the GPS and WiFi modules 38 and 40. Whether the GPS module 38 or the WiFi module 40 is enabled to acquire a transmitted advertisement depends on a setting, i.e., flag or other distinguishing parameter, that is included in the advertisement and conveys that the advertisement is intended to be received by only one or both of the GPS and WiFi modules 38 and 40. At decision block 1240 and upon receipt of the beacon advertisement message, the GPS and/or WiFi module 38, 40 are configured to transmit their respective GPS or WiFi information to communications module 37, in accordance with Equations (1)-(4) and in the form of heartbeat messages, for relay by the communications module 37 to the network 22. Thereafter, at decision block 1250 and prior to the end of the process at decision block 1260, the network 22 determines a location of the mobile AP 30 of Configuration B so as to make that location available for attribution to a connected EN 14 in response to transmitting of its heartbeat messages. As such, the mobile AP 30 location defines the mobile AP 30 as that through which the EN 14 connected to the network 22, as well as that which is perhaps most proximate the EN 14.

Accordingly, the network 22 is enabled to ensure the correct pairing of communications, GPS, and WiFi modules 37, 38 and 40 such that one or more GPS modules 38 and WiFi modules 40 may report their respective information through any communications module 37 that is connectable to the network 22. Thus, a location of a connected EN 14 may be learned despite the number and patterns of GPS and WiFi connections among various communications modules 37.

Optimization of networking procedures and processes, like those embodied hereinabove, is a core aspect of maintaining and enhancing the functionality of network components. This is especially true in the context of BLE devices which are battery powered, and that thus rely on minimized energy use in order to maximize a continuing ability to carry out their networking tasks.

In this regard, many advantages exist in providing component functionality that is centrally coordinated by the network 22 when such components are to engage in tasks such as, for example, asset tracking and relay of desired information. Among these advantages is the ability to obtain maximized component battery life and, thus, the correlating extended time with which a component may function.

In these regards, network 22 is configured to provision timing for operation of its components including one or more of each of its connectable and non-connectable stationary APs 16, mobile APs 30 and ENs 14 to perform their networking functionality, as described hereinabove, according to coordinated scheduling. More specifically, the scheduling is configured to provide both active, i.e., awakened, and sleep modes/states for all of the stationary APs 16, all of the mobile APs 30, or all of the ENs 14, and respective subsets thereof, based on a common network 22 system time to which such components may be periodically re-synched to compensate for individual clock drift. In their active mode, the aforementioned components perform their respective functionalities as described hereinabove, while in sleep mode such functionalities are suspended for the appropriate duration as provisioned by network 22. Such active and sleep modes may be configured to occur during any of the following periods, including in real time, or during a discrete scheduling period, e.g., over the course of a predetermined interval or number of hours, or during maintenance of some or all of the network components, or during a combination of the aforementioned.

Furthermore, and based on the scheduling, network 22 is also configured to impart alternate functionality, i.e., functionality other than that which has been described above, for respective ones of the aforementioned components, as discussed below.

Thus, the confluence of variously provisioned timing and corresponding component functionality is presented according to a number of activity scenarios detailed in FIG. 13. Therein, at least three scenarios, including Scenario 1 (S1), Scenario 2 (S2), and Scenario 3 (S3) are illustrated with respect to network 22 provisioned timings for active and sleep modes among stationary APs 16 and mobile APs 30 that are connectable to the network 22, stationary APs 16 that are not connectable to the network 22, i.e., reference points (RPs) 17, and ENs 14. In these respects, it will be understood that any of the APs 16 and 30, RPs 17, and ENs 14 may initially be configured according to the network 22 system time so as to be active or asleep with respect to a particular scenario. APs 16 and 30 and ENs 14 are contemplated to receive and apply network provisioning through their regularly conducted network communications as described herein. RPs 17, on the other hand, are each contemplated to receive network provisioning enabling their operation according to S1-S3 by virtue of initial programming as an EN 14. That is, an RP 17 will, in order to operate according to S1, S2, or S3, be configured to first function as an EN 14 so as to listen for the network being broadcasted by an AP 16 or 30, and/or RP 17. Once detected, the RP 17 may then connect to the network 22 through an AP 16 or 30 in order to retrieve mailbox messages containing its configuration data. Once retrieved, the RP 17 may then function according to that configuration data with respect to a particular scenario.

In S1, each of the APs 16 and 30, RPs 17 and ENs 14 operate, according to network 22 provisioned timing, in active mode so as to function as described above in connection with FIGS. 3 and 7. That is, ENs 14 actively detect beacon advertisement messages transmitted from APs 16 and 30 and RPs 17 so as to, in accordance with Equations (1)-(4), determine their most proximate access point as well as that to which a connection should be initiated for the relay of information to and the receipt of information from the network 22. Once regularly scheduled tasks are completed, each of these components is configured to lay dormant, or asleep, until the occurrence of a next wakeup time defined by the provisioned timing. Notably, ENs 14 may check their mailbox messages when connected through an AP 16 or AP 30, and also act in accordance with information relayed to the network 22, which is thereafter analyzed by the network 22 to determine necessary adjustments to be relayed back to the ENs through an established connection. For example, in a situation in which an EN 14 relays sensor data such as a temperature reading, an EN 14, if so configured, may sound or otherwise indicate an alarm in response to receipt of messaging from network 22 to do so as a result of an evaluation by network 22 that doing so is appropriate. Additionally, an EN 14 may, when connected to network, receive adjustments for one more parameters and conditions affecting those parameters including, for example, heartbeat interval and latency. Also, an AP 16 or 30 may obtain its own an adjustment of one or more parameters thereof and conditions affecting such parameters. Such parameters may include, for one or more of the APs 16 or 30, a RSSI offset (dBm), a location offset (dB), a level of transmission power (dBm), or latency, or advertising rate, or a combination thereof, in which the location offset represents an adjustment of RSSI of an AP 16 or 30 to bias selection thereof as most proximate according to Equations (1)-(3).

S2 contemplates, as is shown in FIG. 13, an instance in which network provisioned timing causes each of the APs 16 and APs 30 to be active, while the ENs 14 and RPs 17 are asleep. Here, since no connection can be initiated by a respective EN 14 due to its sleep state and since a respective RP 17 is unable to connect with the network 22, APs 16 and 30 are configured to, through time-division multiplexing, operate as centrals 10 according to FIG. 1. That is, APs 16 and 30 may further function to receive beacon advertisement messages from peripherals that do not function as ENs 14, i.e., peripherals 12 according to FIG. 1. As a result of such receipt, the APs 16 and 30 obtain the MAC addresses of the transmitting peripherals 12 and conduct a measurement of RSSI. In this way, network 22 may then receive the MAC addresses and the RSSI measurements, and determine a relative location of the transmitting peripherals 12 based on their beacon advertisement messages. Additionally, APs 16 and 30 may, if configured with spectrum analysis capability, also analyze and report to network 22 other RF signals which are detectable.

Still referring to FIG. 13, a third scenario of provisioned network timing is defined by S3. In this scenario, all or subsets of the APs 16 and 30 and all or subsets of the RPs 17 may be configured to operate in active mode synchronously while ENs 14 are asleep. Such synchronous operation enables the leveraging of alternate modes of operation as described below.

Notably, the absence of RP connectability to network 22 in this scenario, as well as in S2, triggers RPs 17 to begin by operating as an EN 14 so as to receive their initial network 22 provisioning for the given scenario through an available connection.

Thus, a first alternate mode of operation entails each of the RPs 17 being configured to function as an EN 14, in response to receipt of the aforementioned provisioning. This way, an RP 17 may then connect with an AP 16 or an AP 30 to check for mailbox messages on network 22 and receive configuration messages suitable to trigger operation according to S1 or S2.

Additionally, a second mode of operation according to S3 entails all or subsets of each of the APs 16 and 30 and RPs 17 sequentially switching their operability to that of an EN 14. In this example, an RP 17 would first switch its mode of operation to that of an EN 14, and then an AP 16 or 30 would do likewise. As such, an RP 17 is enabled to obtain its mailbox messages and evaluate its proximity and connection determinations according to Equations (1)-(4).

Notably, S3 affords the opportunity to obtain RSSI measurements based on beacon advertisement messages transmitted by APs 16 and/or 30 and RPs 17 that have not switched to operate in accordance with S3, i.e., are operating according to their functionality as prescribed by S1 while awaiting sequential switching as prescribed by S3. For example, in a case in which RPs 17 have switched to operating as an EN 14, RSSI measurements may be obtained by the RP 17 for beacon advertisement messages transmitted from APs 16 and/or 30 that have that are awaiting sequential switching as prescribed by S3. This way, an RP 17, operating as an EN 14, is enabled to transmit a heartbeat message that includes the MAC address of the APs 16 and/or 30 which are deemed most proximate, the MAC address of the AP 16 and/or 30 to which it connected, the RSSI measurement for the received beacon advertisement message(s), and its own RP transmit power level and RSSI offset. In another example, in a case in which APs 16 and/or 30 have switched to operating as an EN 14, which occurs upon the RPs 17 terminating connection to the network 22, such APs 16 and/or 30 may obtain RSSI measurements for beacon advertisement messages transmitted from RPs 17 that are awaiting sequential switching as prescribed by S3. As such, an AP 16 or 30, operating as an EN 14, is enabled to transmit through its backhaul 20 or 32, respectively, the MAC address of the RP 17 or RPs 17 that transmitted the received beacon advertisement message(s), the RSSI measurement for the received message(s), and its own AP transmit power level and RSSI offset. In this way, an AP 16 or 30, through time-division multiplexing, operates as both an EN 14 according to S3, as well as according to its S1 functionality for the transfer to and the receipt of information from the network 22.

Accordingly, the network 22, through adaptation of a tuning function thereat, may then deliver through a connected AP 16 or 30 an adjustment of one or more parameters thereof and conditions affecting such parameters, as well as those of RPs 17 when connected through an AP 16 or 30. Such parameters may include, for one or more of the RPS 17 and APs 16 or 30, a RSSI offset (dBm), a location offset (dB), a level of transmission power (dBm), or latency, or advertising rate, or a combination thereof, in which the location offset represents an adjustment of RSSI of a RP 17 or AP 16 or 30 to bias selection thereof as most proximate according to Equations (1)-(3).

In this way, S3 offers the ability to achieve and obtain an overall mapping of transmission activities and their associated parameters for all or respective ones of the APs 16 and 30 and RPs 17. Based on this mapping, the accuracy of location determination, and overall system performance due to an ability to control battery consumption, owing to optimization of transmit power level, for example, are enhanced.

In each of S1 through S3, it is to be noted that operation of one or more ENs 14, and operational modes of other components operating as ENs 14, may be adjusted by network 22 to execute extended periods of sleep after detection of no access points or a same access point. With respect to that detection, such ENs 14 may also be provisioned to adjust the rate at which heartbeat messages are transmitted in response to detection of specific parameters contained in a transmitted beacon advertisement message including, for example, a predetermined RSSI for which the ENs 14 have been configured to detect. Similarly, access points such as mobile APs 30 may be provisioned by network 22 to transmit their beacon advertisement messages with increasing frequency in response to positioning thereof at or near a predetermined position.

Accordingly, each of the above scenarios serves to optimize the utilization of network components by coordinating the effective use of battery consumption, while at the same time leveraging different modes of component operation to make adjustments affecting that consumption.

Figure 14:
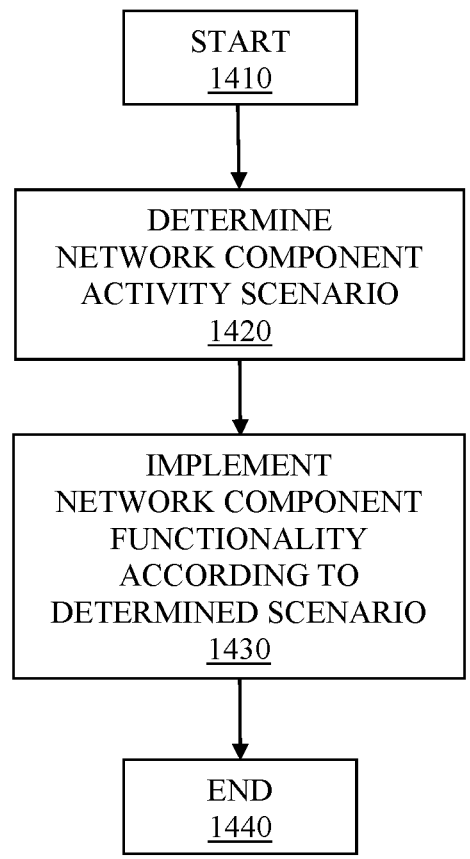
FIG. 14 is a sequence diagram for implementation of a respective scenario of FIG. 13.

In referring to FIG. 14, there is shown a process for operation of the network components associated with S1 through S3 that starts at decision block 1410 and proceeds to decision block 1420. Thereat, network 22 determines the operable scenario of network component activity among S1 through S3. In accordance with the determination, each of the applicable network components is configured, whether through network provisioning or initial setting, to be operable in either an active mode or a sleep mode. At decision block 1430, network components and network 22 implement predetermined network component functionality according to the determined scenario. Multiple scenarios may be implemented cyclically. Once the network 22 has determined that the application environment pertinent to the one or more scenarios is fulfilled, the process ends at decision block 1440.

One or more of each of the APs 16 and 30, RPs 17 and ENs 14 are contemplated to be cooperable according to S1, S2, and S3, or a combination thereof S3, and configured to obtain the aforementioned detections of temperature, light, sound, pressure, humidity, density, moisture, acceleration, voltage, current, material content level and pressure, motion, proximity, magnetism, rotation, orientation, velocity and/or deviation from original condition.

Taking motion detection as an example, it is desirable to increase the accuracy of a proximity determination undertaken by an EN 14 according to Equations (1)-(3) in the event that such a determination may become skewed by equally spaced RF transmissions of beacon advertisement messages. More specifically, obtaining such increased accuracy is beneficial in a case in which the skew is related to those RF transmissions passing through solid barriers, such as a dividing wall between adjacent structurally defined areas, i.e., adjacent rooms in a building, and when it is desired to know the proximity of the EN 14 with respect to one of those areas. Thus, a RP 17 or AP 16 may be configured to include an infrared sensor, such as a passive infrared (PIR) sensor, and to process and include in its transmitted beacon advertisement message an indication of one or more types of motion for which the PIR sensor is configured to detect. Such types of motion may include those that can be characterized based on categories for the comparative pace thereof, such as, for example, walking movement, non-walking or fast-paced movement, and idle activity, though other types of motion may be detected and indicated. An example of at least one of these other types of motion may include that which is characterized by a change in direction, for instance. Correspondingly, an EN 14 may be configured to detect its own type of comparatively paced motion, such as through inclusion of an accelerometer, though other types of motion may be detected according to the inclusion of an appropriate mechanism therefor. As such, the EN 14 may be configured to determine its most proximate RP 17 or AP 16 in accordance with Equations (1)-(3), based on a determination by the EN 14 of a matching motion state between that of the EN 14 and that of the RP 17 or AP 16. In other words, RSSs from an RP 17 or AP 16 whose detected motion state does not match the motion state of the EN 14 would not be considered in the evaluations implemented by the EN 14 when executing Equations (1)-(3). This way, the determination of a matching motion state provides a prerequisite for the proximity determination that is conducted by the EN 14, and thus ensures the accuracy thereof when RF skewing is presented.

Alternatively, and in order to prevent the RF skewing discussed above, an RP 17 or AP 16 may be equipped with an infrared or ultrasound transmitter to transmit an infrared signal in addition to its beacon advertisement message. Correspondingly, an EN 14 could be equipped with an infrared or ultrasound detector. In this way, and when considering use of infrared only (since ultrasound would function similarly), the RP 17 or AP 16 is configured for active infrared transmission, and the EN 14 is configured for active detection. In this instance, the signal transmitted by the RP 17 or AP 16 is encoded with the MAC address or other unique identifier for the RP 17 or the AP 16 for which the EN 14 is configured to detect. Thus, upon decoding and detection by the EN 14 of the infrared signal without errors (as verified by a checksum), the EN 14 shortcuts any proximity determination by the EN 14 such that the transmitting RP 17 or AP 16 would be identified (by its associated MAC address or other identifier) as being most proximate. In cases where an error is indicated, the EN 14 would revert to its proximity determination in accordance with Equations (1)-(3).

Additionally, each of the APs 16 and RPs 17 described herein may be configured to include directional and circularly polarized antennas to, respectively, better focus their broadcasts and reduce cross polarization loss sometimes experienced with vertically polarized antennas. This way, EN 14 proximity determinations may be achieved with increased accuracy.

In these ways, it will be understood that the embodiments disclosed herein optimize the efficiency of a BLE-enabled network by, at least, reducing power consumption of network resources. It will likewise be understood that the embodiments disclosed herein enable a determination of the relative location of an end node in view of its proximity to an access point, whether or not such access point is connectable or non-connectable.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer.

Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A BLE communications system for communicating with a network, comprising:
    an access point (AP) configured to connect with the network, and transmit a first beacon advertisement message;
    an AP not configured to connect with the network, and transmit a second beacon advertisement message, so as to define a reference point (RP);
    an end node (EN) configured to receive the first and second beacon advertisement messages, and initiate a connection with the AP for the transfer of data associated with the EN to the network, and the receipt of data from the network,
    wherein
        in response to the connection with the AP being initiated by the EN, and the data associated with the EN comprising at least identifying information of the EN and identifying information of one or more of the AP and the RP, the AP is caused to transfer to the network the at least identifying information of the EN, and the identifying information of the one or more of the AP and the RP,
        the EN determines whether to initiate the connection with the AP in response to evaluating from the first beacon advertisement message at the time of transmission of the first beacon advertisement message each of at least (a) whether a proximity of the AP to the EN is a nearest proximity and (b) a loading of the network to which the AP is connected, and
        each of the AP, the RP, and the EN is configured by the network to operate according to either an awakened state or a sleep state, the AP being selected as comprising a stationary AP, or a mobile AP.

2. The BLE communications system of claim 1, wherein: the selected AP, the EN and the RP are configured to be operable in their associated awakened state or sleep state based on a predetermined network timing.

3. The BLE communications system of claim 2, wherein the predetermined network timing comprises real time, or a predetermined interval of time, or a combination thereof.

4. The BLE communications system of claim 3, wherein: in response to the EN and the RP being operable in an associated sleep state, the selected AP is further configured to receive a third beacon advertisement message, and transmit to the network information associated with the third beacon advertisement message.

5. The BLE communications system of claim 4, wherein: the third beacon advertisement message is transmitted by an EN configured to transmit the third beacon advertisement message for receipt by the selected AP.

6. The BLE communications system of claim 3, wherein: in response to the EN being operable in an associated sleep state, the RP is configured to receive the first beacon advertisement message, and initiate a connection with the selected AP for the transfer of data associated with the RP to the network, and the receipt of data to be associated with the RP from the network.

7. The BLE communications system of claim 6, wherein: the data associated with the RP and the data to be associated with the RP comprises sensor data, or a received signal strength indicator (RSSI), or a location offset, or a level of transmit power, or an advertising rate, or a latency condition, or a combination thereof.

8. The BLE communications system of claim 3, wherein: in response to the EN being operable in an associated sleep state, the RP and the selected AP are configured to sequentially initiate a connection to the network for the transfer of data associated with the RP and the selected AP, respectively, and the receipt of data to be associated with the RP and the selected AP from the network, respectively.

9. The BLE communications system of claim 8, wherein: the sequential initiation of the connection to the network is initiated by the RP.

10. The BLE communications system of claim 9, wherein: the RP initiates the connection to the network through the selected AP.

11. The BLE communications system of claim 10, wherein:
    the selected AP is configured to initiate the connection to the network in response to the RP terminating the initiated connection thereof.

12. The BLE communications system of claim 11, wherein:
    the data associated with the RP and the selected AP comprises sensor data, or a received signal strength indicator (RSSI), or a location offset, or a level of transmit power, or an advertising rate, or a latency condition, or a combination thereof.

13. The BLE communications system of claim 12, wherein:
    in response to receipt of the data associated with the RP and the selected AP by the network, the AP is configured to transmit the first beacon advertisement message in accordance with receipt of a network adjusted RSSI for the first beacon advertisement message, and the RP is configured to transmit the second beacon advertisement message in accordance with receipt of a network adjusted RSSI for the second beacon advertisement message.

14. The BLE communications system of claim 13, wherein:
    the RP and the selected AP comprise directional and circularly polarized antennas.

15. The BLE communications system of claim 1, wherein: the EN is configured to determine a proximity to the RP and the selected AP based on a matching of a type of motion state of the EN to a type of motion state detected by the RP and a matching of the type of motion state of the EN to a type of motion state detected by the selected AP, respectively.

16. A method of BLE communications, comprising:
    in a system comprising an access point (AP) configured to connect to a network and transmit a first beacon advertisement message, an AP configured to not connect to the network, and transmit a second beacon advertisement message, so as to define a reference point (RP), and an end node (EN), in which the AP is selected as comprising a stationary AP, or a mobile AP, and the EN is configured to initiate a connection with the selected AP in response to the receipt of the first beacon advertisement message, and operating each of the selected AP, the RP, and the EN according to a predetermined network timing configured to trigger an alternate mode of operation of the selected AP, or the RP, or a combination thereof, wherein in response to the connection with the selected AP being initiated by the EN, the AP is caused to transfer to the network at least identifying information of the EN, and identifying information of one or more of the selected AP, and the RP, the EN determines whether to initiate the connection with the selected AP in response to evaluating from the first beacon advertisement message at the time of transmission of the first beacon advertisement message each of at least (a) whether a proximity of the selected AP to the EN is a nearest proximity and (b) a loading of the network to which the selected AP is connected.

17. The method of BLE communications of claim 16, wherein:
the predetermined network timing comprises real time, or a predetermined interval of time, or a combination thereof.

18. The method of BLE communications of claim 17, wherein:
in response to the predetermined timing corresponding to a sleep state for the EN and the RP,
the alternate mode of operation of the selected AP comprises further being configured to receive a third beacon advertisement message, and transmit to the network information associated with the third beacon advertisement message.

19. The method of BLE communications of claim 18, wherein:
the third beacon advertisement message is transmitted by an EN configured to transmit the third beacon advertisement message for receipt by the selected AP.

20. The method of BLE communications of claim 17, wherein:
in response to the predetermined timing corresponding to a sleep state of the EN,
the alternate mode of operation of the RP comprises being configured to receive the first beacon advertisement message, and initiate a connection with the selected AP for the transfer of data associated with the RP to the network, and the receipt of data to be associated with the RP from the network.

21. The method of BLE communications of claim 20, wherein:
the data associated with the RP and the data to be associated with the RP comprises sensor data, or a received signal strength indicator (RSSI), or a location offset, or a level of transmit power, or an advertising rate, or a latency condition, or a combination thereof.

22. The method of BLE communications of claim 17, wherein:
in response to the predetermined timing corresponding to a sleep state of the EN,
the alternate mode of operation of the selected AP and the RP comprises being configured to sequentially initiate a connection to the network for the transfer of data associated with the RP and the selected AP, respectively, and the receipt of data to be associated with the RP and the selected AP from the network, respectively.

23. The BLE communications system of claim 22, wherein:
the sequential initiation of the connection to the network is initiated by the RP.

24. The BLE communications system of claim 23, wherein:
the RP initiates the connection to the network through the selected AP.

25. The BLE communications system of claim 24, wherein:
the selected AP is configured to initiate the connection to the network in response to the RP terminating the initiated connection thereof.

26. The method of BLE communications of claim 25, wherein:
the data associated and to be associated with the RP and the selected AP comprises sensor data, or a received signal strength indicator (RSSI), or a location offset, or a level of transmit power, or an advertising rate, or a latency condition, or a combination thereof.

27. The method of BLE communications of claim 26, wherein:
in response to receipt of the data associated with the RP and the selected AP by the network, the AP is configured to transmit the first beacon advertisement message in accordance with receipt of a network adjusted RSSI for the first beacon advertisement message, and the RP is configured to transmit the second beacon advertisement message in accordance with receipt of a network adjusted RSSI for the second beacon advertisement message.

28. The method of BLE communications of claim 27, wherein:
the RP and the selected AP comprise directional and circularly polarized antennas.

29. The method of BLE communications of claim 16, wherein:
the EN is configured to determine a proximity to the RP and the selected AP based on a matching of a type of motion state of the EN to a type of motion state detected by the RP and a matching of the type of motion state of the EN to a type of motion state detected by the selected AP, respectively.

30. The method of BLE communications of claim 16, wherein:
the EN is configured to determine a proximity to the RP or the selected AP based on a Bayesian maximum a posteriori (MAP) estimation of a plurality of consecutively received signal strengths (RSSs) of respective beacon advertisement messages received from the RP or the AP.

* * * * *